(No Model.)

G. M. D. WILLIAMS.
ATTACHMENT FOR PLOWS.

No. 465,706. Patented Dec. 22, 1891.

Witnesses:

Inventor:
George M. D. Williams
by James Tanner
his Attorney.

UNITED STATES PATENT OFFICE.

GEORGE M. D. WILLIAMS, OF McKINNEY, TEXAS.

ATTACHMENT FOR PLOWS.

SPECIFICATION forming part of Letters Patent No. 465,706, dated December 22, 1891.

Application filed April 15, 1891. Serial No. 389,023. (No model.)

*To all whom it may concern:*

Be it known that I, GEORGE M. D. WILLIAMS, a citizen of the United States, residing at McKinney, in the county of Collin and State of Texas, have invented certain new and useful Improvements in Attachments for Plows; and I do hereby declare the following to be a full, clear, and exact description of the invention, such as will enable others skilled in the art to which it appertains to make and use the same.

My invention has reference to improvements in plows; and it consists in an attachment therefor of peculiar construction, which is arranged on the landside of the plow, and in certain means for adjusting said attachment with relation to the mold-board, whereby the former may be utilized as a cutter or the plow converted into a double-shovel plow, all of which will hereinafter be fully and clearly explained.

Figure 1:
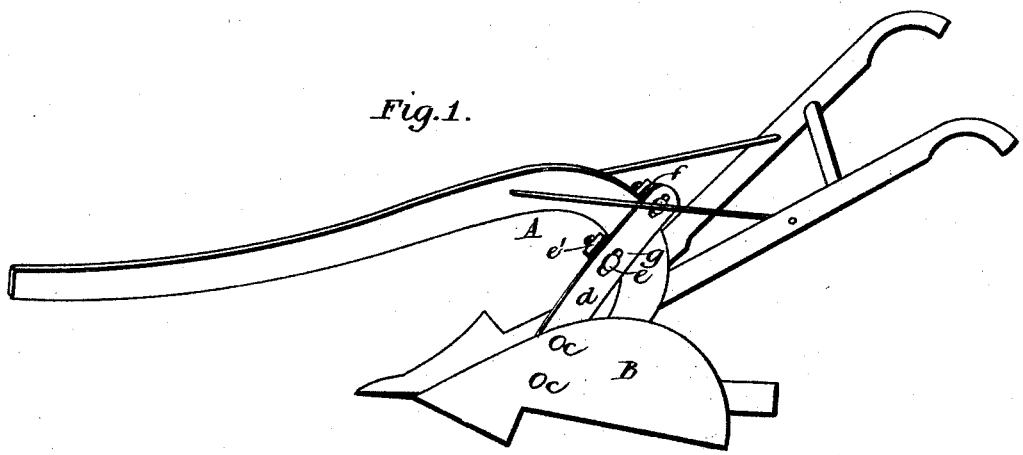
Figure 2:
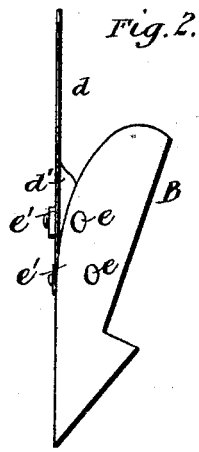
Figure 3:
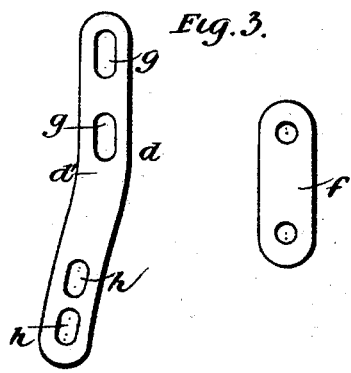

In the accompanying drawings, which form a part of this specification, Figure 1 represents in perspective view a turning-plow of ordinary construction having my improved attachment thereon; Fig. 2, a perspective detail view of such attachment, and Fig. 3 detail views of the device for adjustably securing the attachment.

The reference-letter A represents the plow-beam.

B denotes the attachment, which consists of a mold-board having a lower cutting-edge, as shown. Secured to this mold-board by bolts $c\ c$ is an arm $d$, which is formed with a slight twist, as at $d'$, to give the required angle of adjustment to the mold-board of the plow. This arm is also formed with the slots $h\ h$ for the bolts $c\ c$, which permit of the adjustment of the arm with relation to the mold-board attachment to compensate for wear, and is also formed with the slots $g\ g$, which receive the bolts $e\ e$, which embrace the plow-beam and serve, together with the binding-plate $f$ and nuts $e'\ e'$, to adjustably secure the attachment to the said beam.

In the drawings I have shown the attachment in the position it assumes when the plow is converted into a double-shovel plow for bedding or ridging the ground. The construction of the devices for connecting said attachment, however, permit of the mold-board being raised and converted into a cutter for sod, weeds, and other surface growth. The construction also permits the adjustment of the attachment laterally with the plow-beam.

The above-described attachment is cheaply made and easily applied, and is very efficient in its operation.

I claim—

In a plow, a landside attachment therefor comprising a mold-board, an arm adjustably secured thereto and having the slotted upper portion, a binding-plate, and bolts and nuts for adjustably connecting the mold-board with the plow-beam, whereby the plow may be utilized as a double-shovel plow or the attachment as a cover, as described.

In testimony whereof I affix my signature in presence of two witnesses.

GEORGE M. D. WILLIAMS.

Witnesses:
J. W. SPENCER,
B. M. CULLERY.